United States Patent
Molin et al.

(10) Patent No.: US 8,472,798 B2
(45) Date of Patent: Jun. 25, 2013

(54) METHOD FOR FOCUSING

(75) Inventors: Simon Molin, Malmo (SE); Dennis Nilsson, Malmo (SE)

(73) Assignee: Axis AB, Lund (SE)

( * ) Notice: Subject to any disclaimer, the term of this patent is extended or adjusted under 35 U.S.C. 154(b) by 84 days.

(21) Appl. No.: 13/284,400

(22) Filed: Oct. 28, 2011

(65) Prior Publication Data

US 2012/0106937 A1 May 3, 2012

Related U.S. Application Data

(60) Provisional application No. 61/408,842, filed on Nov. 1, 2010.

(30) Foreign Application Priority Data

Oct. 28, 2010 (EP) ..................................... 10189216

(51) Int. Cl.
*G03B 13/36* (2006.01)

(52) U.S. Cl.
USPC ........................................................ 396/123

(58) Field of Classification Search
USPC ................................. 396/121–123
See application file for complete search history.

(56) References Cited

U.S. PATENT DOCUMENTS

| | | | |
|---|---|---|---|
| 5,842,059 A | 11/1998 | Suda | |
| 5,939,148 A | 8/1999 | Imai et al. | |
| 6,078,688 A | 6/2000 | Cox et al. | |
| 7,432,975 B2 * | 10/2008 | Lee | 348/349 |
| 7,620,310 B2 * | 11/2009 | Nakahara | 396/125 |
| 2006/0077280 A1 * | 4/2006 | Nakahara | 348/353 |
| 2007/0053675 A1 | 3/2007 | Pollard | |
| 2007/0280665 A1 * | 12/2007 | Nakahara | 396/121 |
| 2008/0055457 A1 * | 3/2008 | Nakahara | 348/335 |
| 2009/0116829 A1 * | 5/2009 | Subbotin | 396/102 |
| 2009/0213239 A1 | 8/2009 | Yoshida | |
| 2010/0128162 A1 | 5/2010 | Tanaka | |
| 2012/0106937 A1 * | 5/2012 | Molin et al. | 396/121 |

FOREIGN PATENT DOCUMENTS

| | | |
|---|---|---|
| EP | 2059024 A2 | 5/2009 |
| JP | 10039204 A | 2/1998 |
| JP | 10069545 A | 3/1998 |
| JP | 10142790 A | 5/1998 |
| JP | 2001061096 A | 3/2001 |
| JP | 2001272594 A | 10/2001 |
| JP | 2006513468 A | 4/2006 |
| JP | 2008522273 A | 6/2008 |

(Continued)

*Primary Examiner* — W B Perkey
(74) *Attorney, Agent, or Firm* — Volpe and Koenig, P.C.

(57) ABSTRACT

A camera and a method for selecting a focus region in a camera view have a plurality of focus regions that are defined in the camera view. A focus distance of the camera is repeatedly set to focus at different distances by setting a lens distance of the camera to different lens distance values. A focus value is determined for each focus region at the set lens distance value. A function for a plurality of focus regions is estimated based on a plurality of determined focus value and lens distance value pairs. A local maximum point of the function is calculated for each focus region for which a function has been estimated, where the local maximum point has a lens distance value. Focus regions are grouped, rated and selected based on the lens distance value of the local maximum point of the focus regions and spatial distances between the focus regions.

14 Claims, 6 Drawing Sheets

FOREIGN PATENT DOCUMENTS

| | | |
|---|---|---|
| JP | 2010025985 A | 2/2010 |
| JP | 2010078682 A | 4/2010 |
| WO | 2004061768 A1 | 7/2004 |
| WO | 2006056786 A1 | 6/2006 |

* cited by examiner

METHOD FOR FOCUSING

CROSS REFERENCE TO RELATED APPLICATIONS

This application claims the benefit of U.S. provisional application No. 61/408,842 filed on Nov. 1, 2010 and EPC application no. 10189216.4 filed on Oct. 28, 2010, which are incorporated by reference as if fully set forth.

TECHNICAL FIELD OF THE INVENTION

The present invention relates to automatic focusing in a camera and to selecting a focus region in a camera view.

BACKGROUND OF THE INVENTION

Capturing still video or motion video being out of focus in interesting portions of the camera view may be quite annoying. This may for example be a result of the camera focusing at a different portion of the camera view or the camera not focused at any object or subject of the camera image view at all.

There have been developed and suggested quite a lot of automatic focusing schemes to address this problem. The two main approaches are referred to as active autofocus and passive autofocus, respectively. The active autofocus schemes include measuring the distance to the subject to be captured and adjusting the focus of the camera accordingly. The measuring is generally performed by emitting for instance ultrasonic sound waves or infrared light. The passive autofocus schemes generally include passive analysis of light from the image view entering the camera. Passive autofocus schemes may be based on phase detection or contrast detection. Most contrast detection schemes include calculating a focus value, i.e. a focus measure, of the captured camera view and then determining if the focus value indicates a sharp image. In most focus schemes the process include the calculation of a plurality of focus values at a plurality of different lens distances and based on this plurality or data points determine at which lens distance a focus value indicating a sharp image is achieved. The process is often iterative. The lens distance being a spatial relation between a focus plane of the camera and a lens/lenses of the camera lens. Accordingly, the lens distance is the property of the lens that is changed when the focus of the camera/lens is changed from an object nearby to an object further away and vice versa.

One commonly used method for finding the best sharpness is a one dimensional search procedure for finding a maxima or minima of a curve called line search. This is of great interest when dealing with Auto Focus, since the objective is to find the lens distance which generates the largest focus value along the lens position axis. The line search method applied in an autofocus scheme results in a scheme that requires few iterations and is stable. There are a number of line search methods, which are guaranteed to converge within a finite and rather low number of iterations. Two such fast methods are Golden Section search and Fibonacci search. These work by a construction of diminishing intervals obtained by comparing boundary points with inner points and then moving boundary points to inner points in an iterative manner.

Another family of frequently used methods for finding the lens distance resulting in the sharpest image are hill climbing algorithms with adaptive step size. Hill climbing algorithms operates by stepping through the curve in a consecutive way. The step size is often adjusted according to focus value thresholds so that a focus motor takes smaller steps when in the proximity of a maximum.

SUMMARY OF THE INVENTION

One object of the present invention is to provide an improved camera and an improved focusing method.

In particular, according to one embodiment of the invention, a method for selecting a focus region in a camera view, wherein a plurality of focus regions are defined in the camera view, said method comprising: repeatedly setting a focus distance of the camera to focus at different distances by setting a lens distance of the camera to different lens distance values, determining, in response to setting a lens distance, a focus value for each focus region at the set lens distance value, estimating, when a plurality of focus value and lens distance value pairs have been determined, a function of at least degree two for a plurality of focus regions, wherein the function represents focus values as a function of lens distance values, calculating, for each focus region for which a function has been estimated, a local maximum point of the function, the local maximum point having a lens distance value, grouping focus regions based on the lens distance value of the local maximum point of the focus regions and spatial distances between the focus regions, rating the focus region groups resulting from the grouping of focus regions, and selecting a focus region based on said rating of focus region groups.

One advantage of this embodiment is that it is able to find a local maximum for the focus only using a few different lens distances. The reason for this is that algorithms for estimating such functions only requires a few points and these points may be much further apart than would be possible if only an ordinary hill climbing algorithm was used. Hence, the inventive method finds local focus maxima faster, as the time period required for setting new lens distances is long in relation to processor cycles. Moreover, the fact that fewer settings of the lens distance is required a focus motor arranged to control the focus of the lens lasts longer than in implementations using the prior art methods. Further, by grouping focus regions based on the lens distance value of the local maximum point in focus regions it is possible to improve the focus even more because the focus value relating to an object of interest will not be skewed by objects further away from or closer to the camera.

According to another embodiment, the focus value of a lens distance is determined using a contrast measurement method, which makes it possible to measure focus values using a simple hardware configuration, e.g. comprising an ordinary image sensor and processing means running analyzing code.

In one embodiment, the act of estimating a function is estimating a polynomial, which makes it possible to very quickly estimate a local focus maximum.

In another embodiment, the act of estimating a function is estimating a spline function, which has the potential to make a more exact prediction of the local focus maximum, but may lose somewhat in speed in relation to the method using a polynomial estimate.

According to another embodiment, said grouping of focus regions includes applying an image segmentation algorithm on the focus regions using the lens distance value of each focus region and the spatial distance from each focus region to all other focus regions. Image segmentation algorithms are used to quickly find objects of interest in an image. By using these algorithms on focus regions, it is possible to quickly generate one or a plurality of groups of focus regions each group including focus regions that are likely to include image information of the same object.

In one embodiment, the image segmentation algorithm used is a Graph-Theoretic Clustering algorithm. This algorithm is advantageous in the present application as one calculation produces a plurality of objects ordered by e.g. decreasing size. Thereby, the method becomes faster than when using other image segmentation algorithms. Moreover, adaption of the algorithm is simple because only a few variables have to be considered.

According to another embodiment, said rating of focus region groups is rating the focus region groups based on size of the group, a larger focus region group is rated as preferred in view of a smaller focus region group. The advantage of rating based on size is that the metric of the size is easily processed and may in many applications be the most obvious feature of objects of interest. Hence, increasing the chances of selecting a focus region included in an object of interest According to yet another embodiment, said rating of focus region groups is rating the focus region groups based on position of the focus region group within the camera view, a focus region group having a position closer to a predetermined position is rated as preferred in view of a focus region group having a position at a greater distance from the predefined position. The advantage of rating based on position is that in many applications it is possible to predict where objects of interest will be present. Hence, increasing the chances of selecting a focus region included in an object of interest. Combining the two rating features mentioned above increases the chances of selecting the correct focus region even more.

According to one embodiment, the rating is performed by distributing scores, a focus region group being more preferred is receiving more scores than a focus region group not being preferred as much, and wherein the selecting of a focus region is selecting a focus region included in a focus region group that has received more than half the available scores. By selecting a focus region based on the scores as described above the selection process becomes faster, averaged over time, as it is not necessary for the process to distribute all the scores before selecting focus region. Moreover, it may not be necessary to find all maxima for all regions and thereby less processing is needed.

According to one embodiment, the rating is performed by distributing scores, a focus region group being more preferred is receiving more scores than a focus region group not being preferred as much, and wherein the selecting of a focus region is selecting a focus region included in a focus region group that has received more scores than are left to distribute. By selecting a focus region based on the scores as described above the selection process becomes faster, averaged over time, as it is not necessary for the process to distribute all the scores before selecting focus region. Moreover, it may not be necessary to find all maxima for all regions and thereby less processing is needed.

According to another embodiment, the method for selecting a focus region in a camera view is used in a method for focusing in a camera. When the focus region is selected, the method runs a focus searching algorithm starting searching at the lens distance value of the calculated local maximum of the focus value in the selected focus region, and sets the lens distance value to the lens distance value found by the focus searching algorithm.

The advantage of using the focus region selection method in a focus method or an autofocus method is that the focus region selection method arrives at a lens distance representing a good focus value using few lens distance changing steps in the process which makes the focusing process fast, even when a fine tuning process is applied based on the lens distance achieved in the focus region selection. Hence, the focusing process may achieve fast and precise autofocus operation.

According to another embodiment, the focus searching algorithm is restricted to operate within the focus regions of the focus region group including the selected focus region. By limiting the focus searching to the focus region group only the focus of an area of interest is considered in the calculations of focus values and, thus, the amount of non relevant image information is restricted. Hence, the quality of the focus value and the lens distance may be significantly increased.

According to another aspect of the invention, a camera comprises a plurality of focus regions defined in relation to a camera view of the camera means for repeatedly setting the lens distance of the camera to different lens distance values, means for determining, in response to setting of a lens distance, and a focus value for each focus region at the set lens distance value, and is characterized by a function estimator arranged to estimate, when a plurality of focus value and lens distance value pairs are determined, a function of at least degree two for each focus region, wherein the function represents focus values as a function of lens distance values, means for calculating, for each focus region, a local maximum point of the function, the local maximum point including a lens distance value, a region grouping means arranged to group focus regions based on the lens distance value of the local maximum point of each focus region and spatial distances between the regions, rating means arranged to rate the focus region groups resulting from the grouping of focus regions, and focus region selector arranged to select a focus region based on said rating of focus region groups. The advantages of these devices and means correspond to the advantages implementing the corresponding functionality as disclosed in connection with the method above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF EMBODIMENTS

Figure 1:
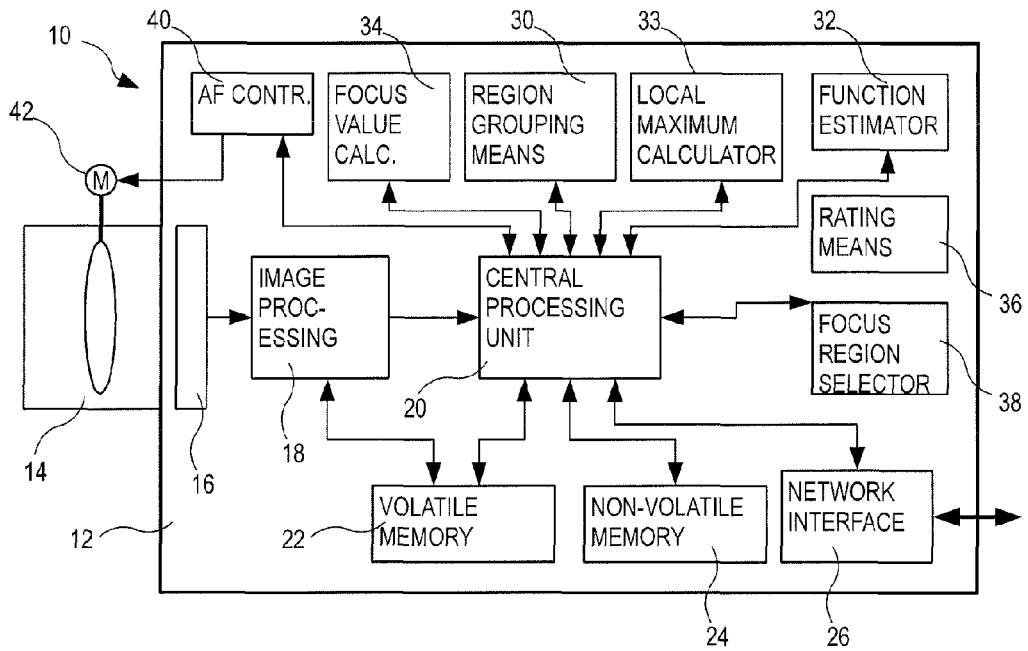
FIG. 1 shows a schematic block diagram of a camera according to one embodiment of the invention.

Before the invention is described in detail, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used herein, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps. Moreover, in the figures like reference characters designate like or corresponding parts throughout the several figures.

A camera 10 arranged to perform one embodiment of the invention is shown in FIG. 1. The camera 10 includes a housing 12, a lens 14, an image sensor 16 for registering an image of a camera view, an image processing unit 18 for initial image processing, a central processing unit 20 for general control and for execution of program code, a volatile memory 22 for temporary storage of information, a non-volatile memory 24 for persistent storage of information, and a network interface 26 for receiving and/or transmitting instructions, information, and image data, over a network. Moreover, the central processing unit 20 is arranged to implement a region grouping means 30, a function estimator 32, means for calculating a local focus maximum from a function 33, a focus value calculator 34, a rating means 36 for rating of regions, a focus region selector 38 for selecting a region based on the rating, and an autofocus controller 40. These functionalities may be implemented by the central processing unit 20 by means of arranging program code that when executed performs the functionality of these devices. Further, the skilled person appreciates that the functionality of these devices also may be implemented using logic circuitry or other hardware configurations.

The autofocus controller 40 is arranged to control a focus motor 42 at the lens 14 in order to adjust the lens distance of the lens 14 and thereby adjust the focus of the camera view captured by the image sensor 16. When controlled by the central processing unit 20 the autofocus controller may be arranged to repeatedly set the lens distance of the camera to different lens distance values in order to enable sampling of a plurality of focus values at different lens distance settings. The lens distance being a spatial relation between a focus plane of the camera and a lens/lenses of the camera lens. Accordingly, the lens distance is the property of the lens that is changed when the focus of the camera/lens is changed from an object nearby to an object further away and vice versa.

The focus value calculator 34 is arranged to calculate a focus value for the present lens distance. The focus value calculator may be arranged to calculate the focus value for substantially the entire camera view or it may be arranged to calculate the focus value for each focus region. If focus values for each region is calculated these may be accumulated or added into a focus value for substantially the entire camera view.

The function estimator 32 is arranged to estimate a function of at least degree two representing a number of focus value–lens position pairs. The detailed functionality of this device will be disclosed below.

The region grouping means 30 is arranged to group focus regions as described below in the description of the corresponding function.

The rating means 36 is arranged to rate the focus region groups as described in the process below. The focus region selector 38 is arranged to select at least one focus region based on the rating of the focus region groups.

According to one embodiment there is provided a method for finding a focus region that is likely to include imagery that should be in focus.

A focus region is a sub area of the camera view. In one embodiment a plurality of focus regions 101-115 are defined for the camera view 100, see FIG. 2. The focus regions are arranged to cover substantially the entire camera view without overlapping each other. In other words, if an area of a focus region is called $P_i$, wherein i is a value from 1 to the number of focus regions 101-115 defined for the camera view 100, the areas $P_i$ are disjoint and $P_1 \cup P_2 \cup \ldots \cup P_n = \Omega$, where $\Omega$ substantially corresponds to the full camera view area and n is the number of focus regions 101-115.

Figure 2:
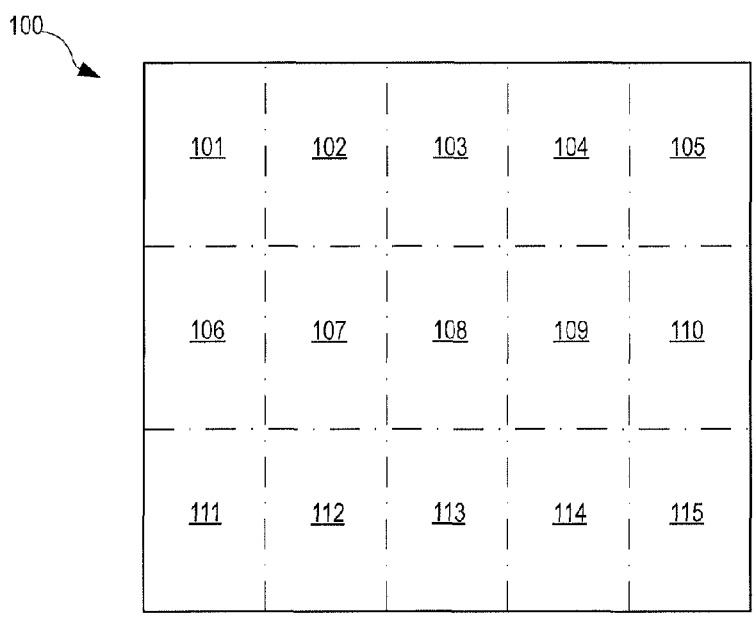
FIG. 2 shows an example of how focus regions may be defined for a particular camera view.

In FIG. 2, fifteen focus regions are depicted, the invention is however not considered limited to this number of focus regions 101-115 as the figure only presents an example and the person skilled in the art would appreciate that the number of focus regions may vary depending on characteristics of the application and/or the execution environment.

Moreover, the focus regions 101-115 of FIG. 2 are defined as rectangular areas. The skilled person would realize that the focus regions may be of essentially any shape as long as the boundary of a focus region substantially traces the boundary of a neighboring focus region. However, one advantage of using rectangular or square shaped focus regions is that it facilitates and simplifies the use of the regions and the mathematics related to the regions.

Figure 3A:
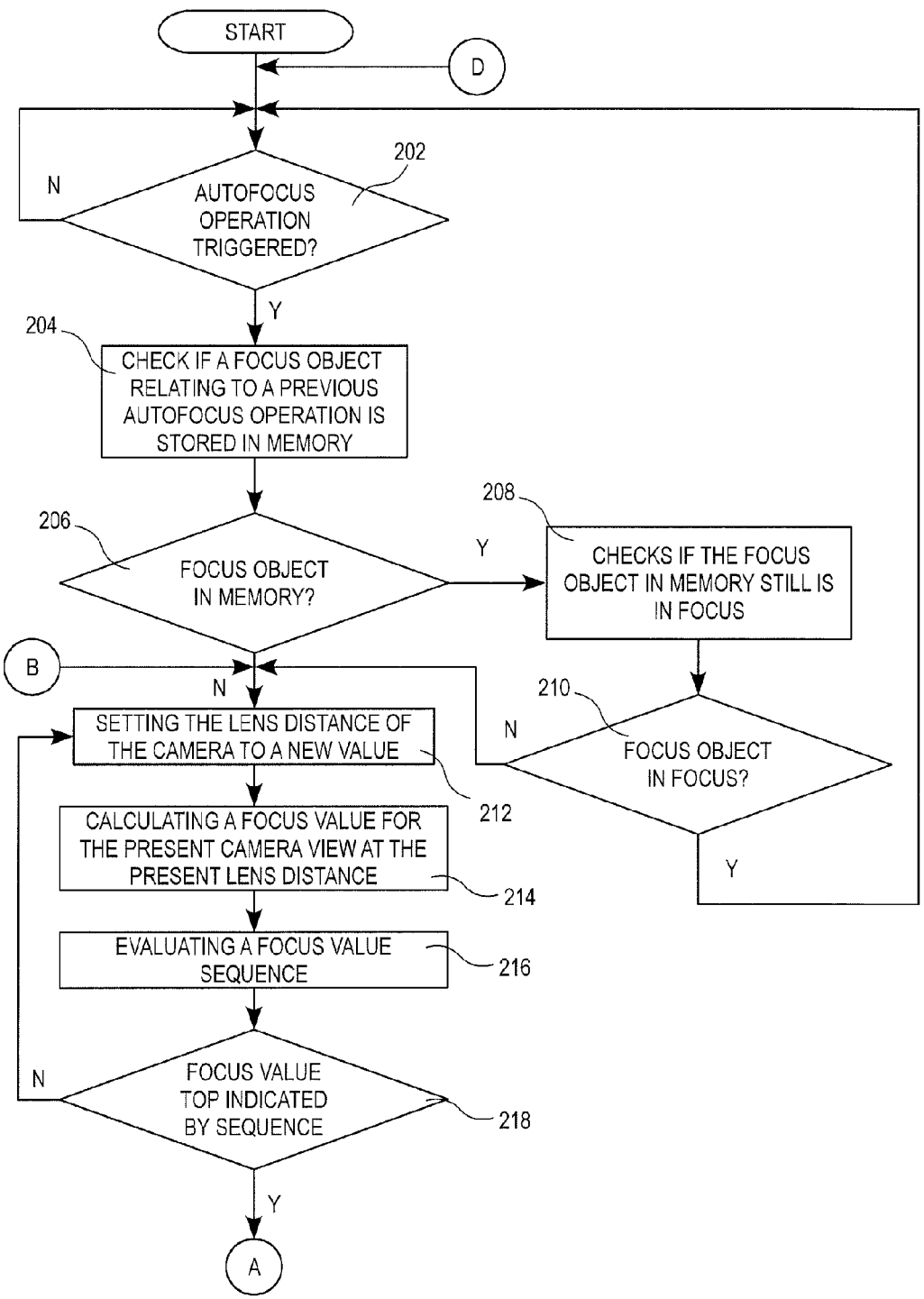
FIG. 3a-c shows a flowchart of a method in a camera for selecting a focus region and for focusing according to one embodiment of the invention.
Figure 3B:
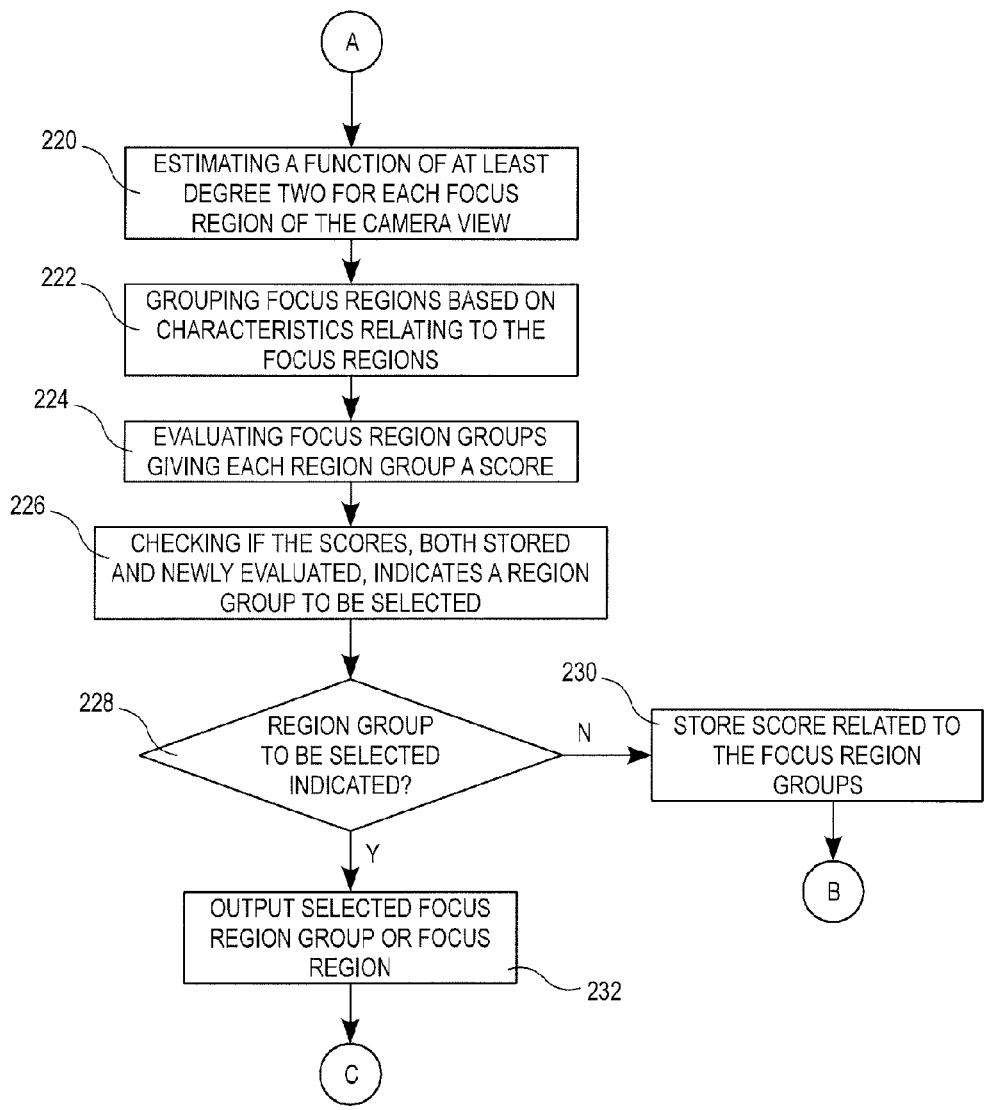

In one embodiment of the method for selecting a focus region in a camera view, see FIG. 3a-b, the process is initiated in response to an event, i.e. the process is waiting for a triggering of the autofocus operation, step 202.

The events or conditions for which the auto focus algorithm is triggered to find a better focused lens position may be implemented according to any one of the following approaches:

Continuously calculating a focus value over substantially the whole image area and if a focus value is lower than a predetermined threshold value relating to an initial "steady state"-focus value, the autofocus is triggered.

Continuously calculating mean values of pixel intensities at a plurality of regions over substantially the entire image area. If the absolute difference between any mean intensity and the initial mean intensity is greater than a predetermined threshold value, the autofocus is triggered.

Continuously calculating a focus value in each focus region defined in the camera view and thereby also in the image area. If the focus measure of a focus region belonging to a focus object changes with some predetermined value, then that focus region is deleted from a focus object in which it has been grouped, the grouping of focus regions into focus objects will be described below. The focus objects of the image view are then to be rerated and if the currently in-focus focus object is no longer considered the object of interest, the autofocus is triggered. This later procedure is similar to the first suggested, but operates on a focus region level instead of on each separate pixel of the image area and utilizes information relating to grouped objects.

When an autofocus operation has been triggered in step 202, a check of whether a focus object relating to a previous autofocus operation is stored in memory, step 204. If such focus object is present in memory, step 206, the process checks if the focus object in memory still is in focus, step 208. The check may be performed by calculating a focus value for one focus region, for a plurality of focus regions, or for all focus regions of the focus object, and comparing the focus value with a predetermined threshold. The focus value may be calculated using any known method, e.g. gradient based, correlation based, statistics based, transform based, or edge based Focus Measures, for further information see Yi Yao, Besma R. Abidi, and Mongi A. Abidi, "Extreme Zoom Surveillance: System Design and Image Restoration," Journal of multimedia, Vol. 2, No. 1, February 2007. If the focus object still is determined to be in focus, step 210, then the process returns to the procedure of waiting for an autofocus trigger at step 202. However, if the focus object is determined not to be in focus then the process of selecting a focus region or a focus object to be in focus is started. A focus object may include one or a plurality of focus regions.

The process of selecting begins by the camera instructing the lens to set the lens distance to a new value, step 212. A focus value for substantially the entice camera view at the present lens distance is calculated, step 214. The calculated focus value is stored and when a plurality of focus values calculated for different lens distances is available a sequence of focus values, including at least two focus values, at different lens distances are evaluated, step 216. If the focus value is considered a function of the lens distance, then a focus graph may be constructed and a maximum in this focus value graph indicates a lens distance of high focus, at least in relation to the neighbouring lens distances. If the focus value sequence indicates that such a focus value high point has not been passed when setting the new lens distance value, step 218, then the process returns to step 212, setting a new lens distance value for the lens.

However, if the focus value sequence indicates that such a focus value high point has been passed, step 218, then the process has found that the image area of the camera view most likely has features in focus at a lens distance in the range from the latest lens distance to the previous lens distance of the sequence of focus values. The process of setting the lens distance, step 212, calculating the focus value, step 214, evaluating the focus value sequence, step 216, and then returning to step 212 as long as no focus value high point is indicated by the sequence, step 218, may for example be implemented as a line search or by a hill climbing algorithm. The precision of the result in this initial part of the process may be less important than to home in on the focus value high point quickly and using few changes in lens distance, in order to spare the focus motor and the mechanical parts involved in focusing. Therefore, the difference between two consecutive lens distance settings may be quite large (e.g., the distance between two consecutive lens distance settings may be of such size that a first focus value high point is indicated within fifteen lens distance changes).

Now referring to FIG. 3b, when an indication of a local maximum focus value being within a specific lens distance range has been achieved, the process continues by estimating a function of at least degree two based on at least three focus values at different lens distance from each focus region, step 220. Characteristics of the estimated function are then used in step 222 for grouping focus regions into focus region groups, i.e. focus regions are grouped into focus region groups based on characteristics of the estimated function related to each focus region. According to one embodiment the grouping of the focus regions is performed using an image segmentation method given the lens distance of a local focus maximum of the function of each focus region and considering the Euclidian distance between the focus regions. One image segmentation method that may be used is for example a method referred to as Graph-Theoretic Clustering, this method is further described below and in "Computer Vision, A Modern Approach", pp. 317-323, Prentice Hall, 2003, by David A. Forsyth University of California at Berkeley and Jean Ponce University of Illinois at Urbana-Champaign.

When the grouping of the focus regions is performed, step 222, the resulting focus region groups are evaluated and each focus region group is given a rate or a score, step 224, based on the evaluation. The evaluation may consider features of the focus region groups, such as size of the focus region group (e.g., the number of focus regions included in the focus region group), proximity of the focus region group to a specific point in the camera view (e.g., the distance to the centre of the image view, to a door, a window, the distance from the camera to the object, etc.). The evaluation may also consider if a group includes specific features (e.g., a human face). Such features may be detected using existing in camera resources. Then, these scores of newly acquired focus region groups and, if available, scores associated with stored focus region groups from a previous focus region grouping but during the same focus region selection session are checked in order to find out if any focus region group has scored a score that is of such size that no other focus region group may get a better score, step 226. All hitherto and in this session identified focus region groups may be considered in the checking step 226 and if a fixed scoring range is used, it becomes possible to select a focus region group even if the focus region group has not scored a majority of the scores. Hence, a focus region group may be selected if the scores left to distribute are less than the score of one single focus region group.

According to one embodiment, a normalised scoring system is used and if the scoring range is 1, then a focus region group is selected if the following relationship is true:

$$Score_{focus\ region\ group} > 1 - \Sigma Score_{other\ focus\ region\ groups}$$

This would also mean that the focus region group is selected if the score of the focus region group is greater than 0.5.

If no focus region group has scored enough for being selected, step 228, then the process continues by storing the score/scores for the identified focus region group or groups, step 230. Then the process returns to step 212 in order to identify further focus region groups to consider for the selection.

However, if a focus region group has scored enough, then the focus region group is selected, step 228, and the focus region group is outputted as the selected focus region group, step 232. One advantage of this procedure is that it is not necessary to find, analyse, and rate all focus region groups present in the image view, because the process continues by selecting a focus region group as soon as it is evident that the particular focus region group cannot be outscored. In one embodiment, it is not necessary to output the entire focus region group, but rather one or a subset of the focus regions included in the selected focus region group. Selection of such focus region or regions may be implemented to select the region/regions having the highest focus value, the most central position within the focus region group, etc.

Figure 3C:
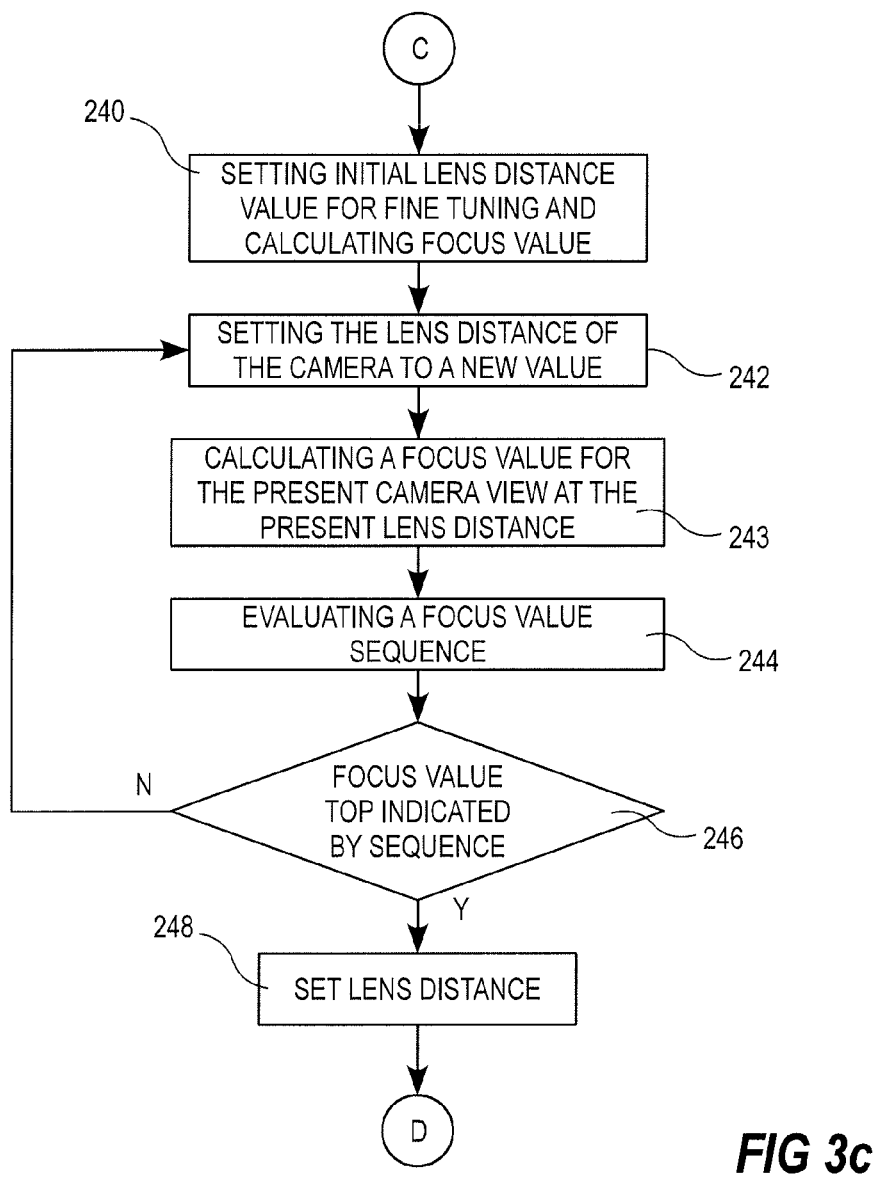

Moreover, the selected focus region group, focus region, or focus regions may be outputted to a focus fine tuning process arranged to fine tune the lens distance of the camera, see FIG. 3c. According to one embodiment, this fine tuning process starts by setting an initial lens distance for the camera based on the local maximum of the estimated focus value function of the selected focus region from the selected focus region group, or of a plurality of focus regions from the selected focus region group, step 240. Then, once more, a process of changing of lens distance, step 242, is started by setting the lens distance of the camera to a new value. Then a focus value for the present camera view at the present lens distance is calculated, step 243. The calculated focus value is stored and when a plurality of focus values calculated for different lens distances is available a sequence of focus values, including at least two focus values, at different lens distances are evaluated, step 244. Considering a graph representing the focus values for lens distances, a high point in this focus value graph then indicates a lens distance representing high focus, at least in relation to the neighbouring lens distances. If the focus value sequence indicates that such a focus value high point has not been passed when setting the new lens distance value, step 246, then the process returns to step 242 setting a new lens distance value for the lens. In the fine tuning process, the difference between two consecutively set lens distance values is smaller than the difference between two lens distance values set in step 212. According to one embodiment, the difference between two consecutive set lens distance values of the fine tuning is 1/10 to 1/100 of the difference between two consecutive lens distance values set in step 212. The steps of fine tuning, steps 242-246, may for example be implemented using a hill climbing algorithm or line search.

If a local maximum in the focus value function is indicated in step 246 then a suitable lens distance for the present camera view has been found and the lens distance is set, step 248. The lens distance may be set to the lens distance corresponding to the largest focus value (i.e., the focus value calculated previous to the latest or it may be set to a lens distance between the lens distances of the two latest focus values). When the lens distance is set and the camera view thereby is correctly focused again, the process returns to step 202 waiting for another event triggering a new focus setting.

Figure 4:
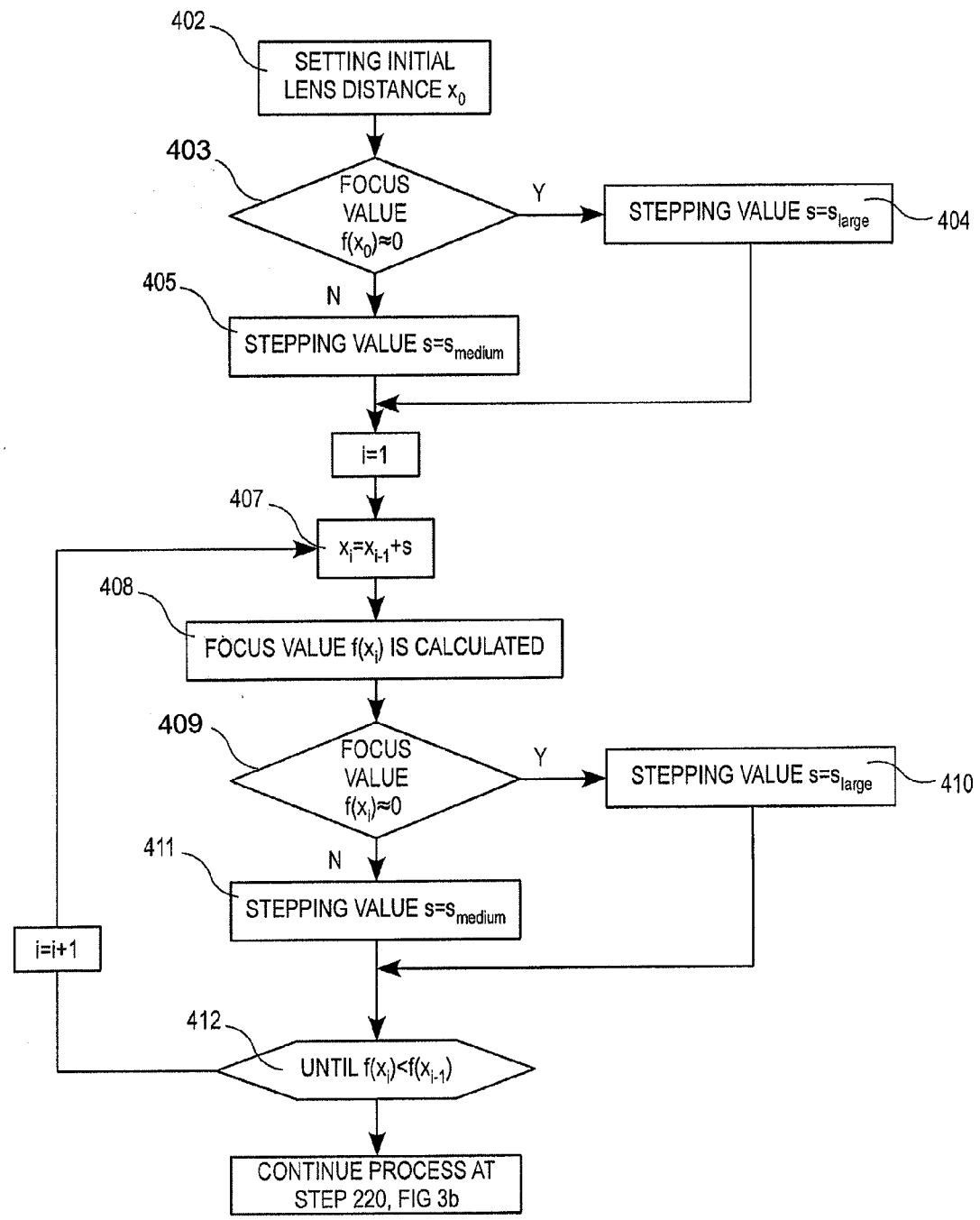
FIG. 4 shows a flowchart of a method for initially find lens distances and corresponding focus values for enabling estimation of a function graph according to one embodiment of the invention.

The first iterative process for finding a suggested focus maxima (i.e., steps 212-218 in FIG. 3a), is, according to one embodiment, implemented by using few iterations to quickly identify a lens distance value being in a range of a likely focus maxima. This may be achieved by the process of FIG. 4, starting by setting the lens distance to a suitable start search value $x_0$, step 402. The start search value may vary depending on whether the process is running for the first time in the autofocus session or whether the process has returned from identifying focus region groups but has not been able to select any. In the case of the process running for the first time in the autofocus session, the lens distance start value may be set to a lens distance very close to the camera, and when the process is returned from identifying focus region groups, the lens distance start value $x_0$ may be set to a stored lens distance value plus the preset distance between consecutive lens distances. The distance between consecutive lens distances will be referred to as stepping distance s, in the following. The value of the stepping distance s may vary during the iteration. If the focus value f(x) at the present lens distance x is substantially zero (i.e., no focus, step 403), then s is representing a larger step $s_{large}$ than if the calculated focus value f(x) is not substantially zero, step 404. The stepping distance for f(x) not being substantially zero is referred to as $s_{medium}$, step 405. According to one embodiment, the stepping distance $s_{medium}$ is about half the distance of the larger step $s_{large}$. However, the skilled person appreciates that the $s_{medium}$ stepping distance may be of any value resulting in few steps being required and that enough focus values around the maximum are registered for estimation of a polynomial.

Then the process continues by setting the lens distance for the first iteration, i=1, to a value corresponding to a previous lens distance value plus the stepping distance s (i.e., $x_i = x_{i-1} + s$, step 407). For the first iteration, this corresponds to $x_1 = x_0 + s$. The focus value of the new lens distance is calculated f($x_i$) using one of the previously mentioned focus measure calculation schemes and recorded, step 408. Then the focus value is checked, step 409, in order to determine the size of the stepping distance s, steps 410, 411, in the same way as in steps 403, 404, 405. The step from setting the lens distance, step 407, to the step of determining the stepping size s is then repeated until the latest focus value f($x_i$) is smaller than the previous focus value f($x_{i-1}$) (i.e., f($x_i$)<f($x_{i-1}$), step 412). When that occurs, the process indicates that a focus value high point has been found and the process may be continued to step 220 in FIG. 3b.

The fine tuning process used to make the final focusing, i.e. the steps 240-246 in FIG. 3c, may be implemented in a similar way as the process for finding a suggested focus maximum. However, the purpose of the fine tuning process is to find a focus maximum and a lens distance that is very close to the best possible focus maximum and lens distance of either a focus region or a group of focus regions. Since the focus maximum achieved by calculating local maxima from the previously estimated function/functions is likely to be close to the real maxima, the fine tuning process may be quite simple.

Figure 5:
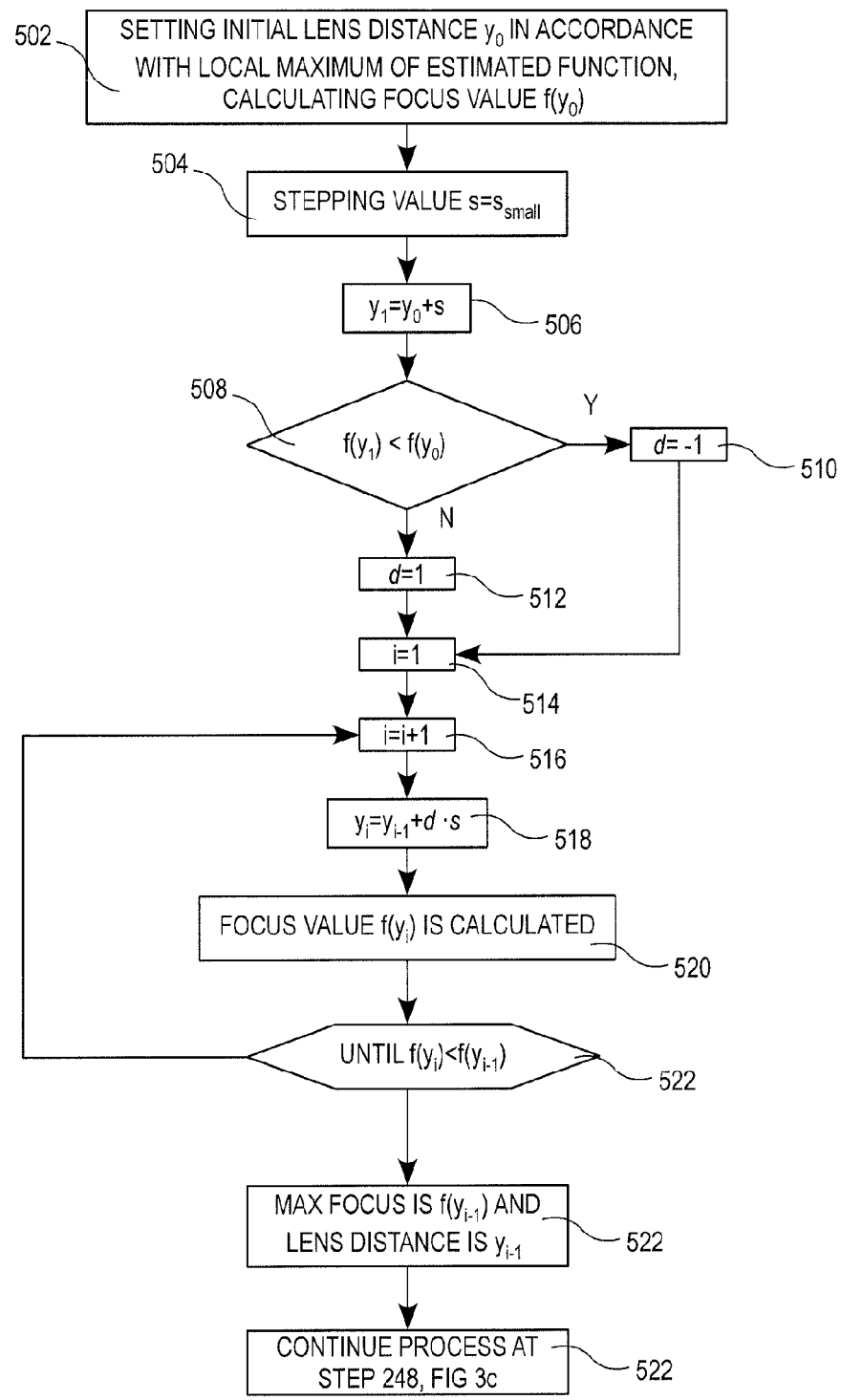
FIG. 5 shows a flowchart of a method for fine tuning the lens distance in order to find an optimal focus value based on a previously calculated local focus maximum according to one embodiment of the invention.

Such a fine tuning process is showed in FIG. 5 and starts with the step of setting the initial lens distance $y_0$ to the lens distance value given by the local maximum of the estimated function of the selected focus region or to a mean lens distance value calculated from lens distance values of the focus regions included in the selected focus region group and the focus value f($y_0$) for the lens distance $y_0$ is calculated, step 502. The lens distance stepping s is set to a small value stepping value, $s_{small}$, in order to achieve acceptable precision in the resulting focus, step 504.

Then a second lens distance is set by either incrementing or decrementing the initial lens distance by the stepping value s. In order to facilitate the understanding of the process we will only show the implementation where the initial lens distance is incremented. Hence the second lens distance $y_1$ is set to $y_1 = y_0 + s$, step 506. Then, the focus value f($y_0$), f($y_1$), at the initial $y_0$ and the second $y_1$ lens distance are compared in order to determine if the lens distance is to be decreased or increased in order to make the lens distance closing in on the lens distance of the focus maximum. As the second lens distance $y_1$ was selected to be greater than the initial lens distance $y_0$, the direction may be decided by comparing the second focus value f($y_1$) to the first focus value f($y_0$).

If the second focus value f($y_1$) is smaller than the first focus value f($y_0$), then the focus maximum is located at a smaller lens distance value and hence, the lens distance value for the next focus value calculation is to be less than the first two lens distance values $y_1$, $y_0$. Otherwise the focus maximum is located at a greater lens distance value and hence, the lens distance value for the next focus value calculation is to be higher than the first two lens distance values $y_1$, $y_0$. This is checked in step 508 and the stepping direction is set in steps 510 or 512 by setting a variable d to a negative value if the lens distances are to be decreased, step 510, and to a positive value if the lens distances are to be increased, step 512.

In step 514, a counter i used for identifying the different lens distances and focus values is set to 1, the counter is then increased by one to indicate that the next focus value is to be processed, step 516. Then the new lens distance $y_i$ is calculated by adding the stepping distance s, multiplied with the direction variable d, to the previous lens distance $y_{i-1}$, step 518. A new focus value f($y_i$) is calculated using the lens distance $y_i$, step 520.

The process from the step of increasing the counter i, step 516, is then repeated until a focus value that is smaller than the previous one is found, i.e. f($y_i$)<f($y_{i-1}$), step 522. When such a focus value is found, that focus value is the maximum focus value and the lens distance is the lens distance to be used in the camera, step 524. The process now returns to step 248 in FIG. 3c to set the lens distance of the camera.

For implementing passive autofocus, the calculation of a focus value may be performed in accordance with any class of Focus Measures (e.g., any one of gradient based, correlation based, statistics based, transform based, and edge based methods, as discussed earlier).

Gradient based methods involve estimating the image gradient by differencing or high pass filters. One such gradient method is a method called the Tenenbaumgradient, see "Accommodation in Computer Vision," by J. M. Tenenbaum Ph.D. dissertation, Dept. of Comput. Sci., Stanford Univ., Stanford, Calif., 1970. This method is based on convolving the image with the horizontal and vertical Sobel kernels respectively and summing the squares of them to form a focus value.

Other possible methods are the use of a Laplacian filter or a one dimensional difference calculations. Yet another possible method is to use a filter kernel referred to as the Midfrequency Discrete Cosine Transform Operator which is derived by S. Lee, Y. Kumar, J. Cho, S. Lee, and S. Kim from determination of the essential frequencies in the discrete cosine transform of the image, see "Enhanced Autofocus Algorithm Using Robust Focus Measure and Fuzzy Reasoning," by Sang-Yong Lee, Yogendra Kumar, Ji-man Cho, Sang-Won Lee, and Soo-Won Kim, IEEE Transactions on Circuits and Systems for Video Technology, Vol. 18, No. 9, September 2008.

Further methods are given by correlation based measures, which gives the amount of dependency between neighbouring pixels by simple multiplications. One approach can be to calculate one sample of the autocorrelation function, see "Evaluation of autofocus functions in molecular cytogenetic analysis" by A. Santos, C. Ortiz De Solorzano, J. J. Vaquero, J. M. Pena, N. Malpica, and F. Del Pozo, Journal of Microscopy, Vol. 188, Pt 3, December 1997, pp. 264-272. Another method that is suggested by P. T. Yap and P. Raveendran is utilizing the correlation between pixels and Chebyshev moments, see "Image focus measure based on Chebyshev moments" by P. T. Yap and P. Raveendran, IEE Proc.-Vis. Image Signal Process., Vol. 151, No. 2, April 2004.

Examples of the statistics based methods, are the Absolute Central Moment which was shown by Shirvaikar, see "An Optimal Measure for Camera Focus and Exposure", Mukul V. Shirvaikar, Electrical Engineering Department, University of Texas at Tyler, Tyler, Tex. 75799 USA, 2004, to have a good discrimination power regarding Focus and the Exposure against other histogram based measures such as the grey level variance. Both of these involve summing the difference between the pixel values and the mean of all pixel values.

Another simple measure is defined as the difference between the maximum and minimum grey levels, see "Extreme Zoom Surveillance: System Design and Image Restoration", by Yi Yao, Besma R. Abidi, and Mongi A. Abidi, Journal of multimedia, Vol. 2, No. 1, February 2007. There are also several measures based on entropy, such as entropy of the relative frequencies of image grey levels, see "Evaluation of autofocus functions in molecular cytogenetic analysis" by A. Santos, C. Ortiz De Solorzano, J. J. Vaquero, J. M. Pena, N. Malpica, and F. Del Pozo, Journal of Microscopy, Vol. 188, Pt 3, December 1997, pp. 264-272, and a recently proposed method using the Bayes entropy function over a normalized cosine transform over the image, see "A Bayesspectral-entropy-based measure of camera focus using a discrete cosine transform" by Matej Kristan, Janez Pers, Matej Perse, Stanislav Kovacic, Faculty of Electrical Engineering, University of Ljubljana, Trzaska 25, 1001 Ljubljana, Slovenia, 2005, which is combining statistics based methods with frequency based methods.

Moreover, transform based methods are based on transforming the image to frequency domain either with FFT, DCT or wavelets and then in most cases, measuring the energy of a selected set of frequency coefficients, see "Extreme Zoom Surveillance System Design and Image Restoration", by Yi Yao, Besma R. Abidi, and Mongi A. Abidi, Journal of multimedia, Vol. 2, No. 1, February 2007, and "Wavelet-based autofocusing and unsupervised segmentation of microscopic images", by Ge. Yang and Nelson, B. J., pp. 2143-2148, in "Intelligent Robots and Systems, 2003. (IROS 2003). Proceedings. 2003 IEEE/RSJ International Conference on".

Edge-based measures make use of an ideal model of how a step edge looks like, including parameters as contrast, orientation and scale, see "Blind Image Quality Assessment" by Xin Li, Digital Video Department, Sharp Labs of America, 2002.

The method for selecting a focus region or a group of focus regions includes the act of estimating a function of at least degree two for each focus region of the camera view (see step 220 in FIG. 3b). The estimation of functions may be performed using a couple of different methods. These methods have one thing in common and that is that they use a plurality of focus value–lens distance pairs (i.e., a focus value calculated at a specific lens distance). Therefore, the system has to at least temporarily store such pairs.

One of the methods includes interpolating points with a polynomial (e.g., a second order polynomial as illustrated in the following example). Even if the example is presented for polynomial of degree two, the skilled person appreciates that higher order polynomial may be interpolated. In this example the three latest lens distances $[x_1, x_2, x_3]$ have corresponding calculated focus values $[y_1, y_2, y_3]$. These points are to be interpolated with some quadratic polynomial, that is:

$$y_i = a_1 x_i^2 + a_2 x_i + a_3$$

This leads to a linear equation system:

$$\begin{pmatrix} x_1^2 & x_1 & 1 \\ x_2^2 & x_2 & 1 \\ x_3^2 & x_3 & 1 \end{pmatrix} \begin{pmatrix} a_1 \\ a_2 \\ a_3 \end{pmatrix} = \begin{pmatrix} y_1 \\ y_2 \\ y_3 \end{pmatrix}$$

We denote the lens position matrix with X, the coefficient matrix with a and the focus value matrix with y. Assuming that every lens position, $x_i \geq 1$, is unique, it is evident that X has full rank and is therefore invertible. The coefficients are obtained by:

$$a = X^{-1} y$$

Then the focus value of any lens position may be estimated sufficiently close to these samples. Furthermore, the possibility of estimating the location, $\hat{x}$ of a possible focus peak is trivial.

$$y' = 2a_1 x + a_2$$
$$0 = 2a_1 \hat{x} + a_2$$
$$\hat{x} = \frac{-a_2}{2a_1}$$

The method is applicable on higher orders of the polynomial, although the calculation of the roots $\hat{x}_i$ is less trivial for orders $\geq 4$. Note that the order, n, of the polynomial requires the number of samples used to be n+1.

Another method for estimating a function is a least square fitting based method. This method involves fitting a polynomial, once more is the example a quadratic polynomial, to a set of data. However, in this method the system is overdetermined. In the example below the three latest lens distances $[x_1, x_2, x_3, x_4]$ have corresponding calculated focus values $[y_1, y_2, y_3, y_4]$, which results in the overdetermined system:

$$\begin{pmatrix} x_1^2 & x_1 & 1 \\ x_2^2 & x_2 & 1 \\ x_3^2 & x_3 & 1 \\ x_4^2 & x_4 & 1 \end{pmatrix} \begin{pmatrix} a_1 \\ a_2 \\ a_3 \end{pmatrix} = \begin{pmatrix} y_1 \\ y_2 \\ y_3 \\ y_4 \end{pmatrix}$$

In matrix form this can be written:

$$Xa = y$$

This can be solved by multiplying with the transpose of X as follows:

$$X^T y = X^T X a$$

Solve with respect to a according to the following:

$$a = (X^T X)^{-1} X^T y$$

The inverse can be calculated numerically or if well fitted directly. If the x-positions are translated around origo and in some cases mirrored around it (if the x-positions are equally spaced), a direct solution is easily achieved. This type of LSQ fitting minimizes the vertical offsets from the focus values, y, to the calculated polynomial. Thus some degree of noise reduction is added.

Yet another method that may be used is to interpolate the points using splines. This is an expansion of the straightforward unique polynomial fitting. The idea is to divide the entire set of data points into segments of n+1 points, where each segment is interpolated by a polynomial of order n. This means that the last point of each segment will also be the first point of the next, and thereby interpolated by two different polynomials.

Common splines are the Cubic Spline, where each segment is interpolated by a cubic polynomial and the Quadratic Spline, where each segment is interpolated by a polynomial. In the following equations xi represents a lens distance and yi represents the corresponding focus value, i.e. notation corresponds to the notation used above in the examples of the polynomial variants. A cubic spline has the following properties:

$$S(x) = \begin{cases} S_0(x), & x_0 \leq x \leq x_1 \\ S_1(x), & x_1 \leq x \leq x_2 \\ \vdots & \vdots \\ S_{N-1}(x), & x_{N-1} \leq x \leq x_N \end{cases}$$

where $$S_i = a_i x^3 + b_i x^2 + c_i x + d_i$$

The problem has 4N unknown variables since each $S_i$ has four unknowns, $[a_i, b_i, c_i, d_i]$. If the spline interpolates N+1 points, we end up with 4N−2 conditions since:

$S_i(x_i) = y_i$ for $0 \geq i \geq N-1$ and $S_{N-1}(x_N) = y_N$ gives N+1 conditions $S_{i-1}(x_i) = S_i(x_i)$ for $1 \leq i \leq N-1$ gives N−1 conditions $S'_{i-1}(x_i) = S'_i(x_i)$ for $1 \leq i \leq N-1$ gives N−1 conditions $S''_{i-1}(x_i) = S''_i(x_i)$ for $1 \leq i \leq N-1$ gives N−1 conditions To solve the problem, one needs to impose two extra conditions. The Natural Cubic Spline includes the following two boundary conditions:

$$S''(x_0) = S''(x_N) = 0$$

Now let $h_i = x_{i+1} - x_i$ and $z_i = S''(x_i)$. The solution to the problem is obtained as:

$$S_i(x) = \frac{z_i}{6h_i}(x - x_i)^3 + \frac{z_i}{6h_i}(x_{i+1} - x)^3 + C_i(x - x_i) + D_i(x_{i+1} - x)$$

where $$C_i = \frac{y_{i+1}}{h_i} - \frac{h_i}{6} z_{i+1}$$

$$D_i = \frac{y_i}{h_i} - \frac{h_i}{6} z_i.$$

The $z_i$ values are determined from solving a tridiagonal matrix equation obtained from the recursive nature of splines.

$$H \begin{pmatrix} z_1 \\ z_2 \\ \vdots \\ z_{N-2} \\ z_{N-1} \end{pmatrix} = \begin{pmatrix} 6(b_1 - b_0) \\ 6(b_2 - b_1) \\ \vdots \\ 6(b_{N-2} - b_{N-3}) \\ 6(b_{N-1} - b_{N-2}) \end{pmatrix}$$

where $$H = \begin{pmatrix} 2(h_0 + h_1) & h_1 & 0 & 0 & 0 \\ h_1 & 2(h_1 + h_2) & h_2 & 0 & 0 \\ 0 & \ddots & \ddots & \ddots & 0 \\ 0 & 0 & h_{N-3} & 2(h_{N-3} + h_{N-2}) & h_{N-2} \\ 0 & 0 & 0 & h_{N-2} & 2(h_{N-2} + h_{N-1}) \end{pmatrix}$$

Since H is tridiagonal, the inverse of H can be calculated relatively fast.

Another method that can be used is smoothing splines. This is a method for smoothing a spline function and thereby suppresses noise in the data. The smooth spline with two continuous second derivatives is obtained by, $$\min_{S(x)} \left[ \sum_{i=0}^{N} \{y_i - S(x_i)\}^2 + \lambda \int \{S''(x)\}^2 dx \right]$$

where $\lambda \geq 0$ is a regulating smoothing parameter. If $\lambda \to 0$ it converges to the non-smooth spline. Conversely if $\lambda \to \infty$, it converges to a least square estimate. Though this minimiser is defined on an infinite-dimensional function space, it has an explicit, finite-dimensional unique solution: a natural cubic spline with knots at the unique values of the $x_i$.

To solve this rewrite the spline as:

$$S(x) = \sum_{j=1}^{N} N_j(x) z_j$$

where $N_j(x)$, $1 \leq j \leq N$ is an N-dimensional set of basis functions representing the family of natural splines.

In matrix form the minimiser can be written:

$$\min_{N,z} [(y - Nz)^T (y - Nz) + \lambda z^T \Omega_N z]$$

where $\{N\}_{ij} = N_j(x_i)$ and $\{\Omega_N\}_{jk} = \int N''_j(x) N''_k(x) dx$. Finally the smooth spline can be written as:

$$\hat{S}(x) = \sum_{j=1}^{N} N_j(x)(N^T N + \lambda \Omega_N)^{-1} N^T y$$

Then a suitable smoothing parameter $\lambda$ has to be selected. There are techniques for an automatic selection of $\lambda$, but since the SNR (Signal-to-noise ratio) is known, the selection is based on the SNR.

According to one embodiment, grouping of focus regions is performed in the method for selecting a focus region and in the method for performing autofocus (e.g., step 222 of FIG. 3b). A grouping method that may be used, as mentioned earlier, is a method referred to as Graph-Theoretic Clustering. The method is normally used for segmentation of elements in a digital image (e.g., a person, an animal, an object, etc).

The grouping method is applied on the focus regions of the image view using at least the local maximum calculated for each focus region and the Euclidian distance between the regions.

In the grouping method, let G=(V,E) be a weighted graph, that is, a weight is associated with each edge $E_i$ linking two vertices $V_k$ and $V_l$. We will assume that the graph is complete, meaning that every pair of distinct vertices is connected by a unique edge. Furthermore, the graph will be expanded with a self-loop for each vertex. If every vertex is denoted by a unique index, the graph can be represented by the square symmetric matrix below.

$$G = \begin{pmatrix} 1 & 0.4 & 0.3 & 0.4 \\ 0.4 & 1 & 0.2 & 0.3 \\ 0.3 & 0.2 & 1 & 0.8 \\ 0.4 & 0.3 & 0.8 & 1 \end{pmatrix}$$

The i, j:th element of the matrix will correspond to the weight between the i:th and j:th vertex in the graph. Said image segmentation method may for instance be implemented in the present invention by making each vertex correspond to each focus region in the image. The weights in the graph will now be seen as a kind of "similarity measure", referred to as affinity measure, between the focus regions. This affinity measure will lay the base for which focus regions should be grouped together in a cluster, forming a focus region group.

Different affinity measures are used for different purposes respectively, but a joint property should be that similar vertices should produce large weights, whereas different vertices should produce small weights. Two different affinity measures may be used simultaneously. In the one embodiment, affinity by distance and affinity by intensity is used.

The affinity by distance measure may include a spatial Euclidian distance in the image, since two nearby focus regions are more likely to belong to the same object than two distant ones. An exponential form similar to a Gaussian distribution is proposed as the affinity measure:

$$A_d(x, y) = e^{-\frac{(x-y)^T(x-y)}{2\sigma_d^2}}$$

where x is the position vector of the first objective focus region and y is the position vector of the other.

The use of affinity by intensity may also be relevant for the grouping since the intensity over an object is likely to be similar. The same exponential form is used for this measure:

$$A_I(x, y) = e^{-\frac{(I(x)-I(y))^T(I(x)-I(y))}{2\sigma_I^2}}$$

where I(x) is the intensity of the first objective focus region and I(y) is the intensity of the other.

The variables $\sigma_d$ and $\sigma_I$ are variances.

The two different affinity measures are combined by $$A(x,y) = A_d(x,y) \cdot A_I(x,y)$$

Let $w_n$ be an association vector for the nth cluster of an camera view. This means that $w_n$ has one element for each focus region and that these elements should be large if the corresponding focus regions are to be grouped in the cluster. An objective function can be constructed as:

$$w_n^T A w_n$$

where A is the affinity matrix. This is actually a sum of terms of the form:

(association of element *i* with cluster *n*)×(affinity between *i* and *j*)×(association of element *j* with cluster *n*)

The elements included in a cluster should have large association weights with this cluster and that the affinities between the included elements should be large. Hence the problem becomes to maximize the objective function $w_n^T A w_n$ with respect to $w_n$ and subject to $w_n^T A w_n = 1$. This problem is solved by constructing the Lagrange function and maximizing the following expression:

$$w_n^T A w_n + \lambda(w_n^T w_n - 1)$$

Differentiation yields an eigenvalue equation:

$$A w_n = \lambda w_n$$

Apparently, $w_n$ is an eigenvector of A, so the elements belonging to the $n^{th}$ cluster are defined by the larger elements of the $n^{th}$ eigenvector. Since $w_n^T A w_n = 1$, we can consider an element $w_n(i)$ to be large enough if:

$$\frac{1}{\sqrt{L}} \leq w_n(i),$$

where L is the length of the vector $w_n$. The best cluster is obtained from the eigenvector corresponding to the largest eigenvalue.

The Graph-theoretic Clustering involves the calculation of an eigenvector corresponding to the dominant eigenvalue. A simple algorithm for calculating such eigenvector is called Power Iteration and may be described as follows:

$$b_0 = [0...0]^T$$
$$b_1 = \left[\frac{1}{\sqrt{L}} ... \frac{1}{\sqrt{L}}\right]^T$$
while
$$((b_k - b_{k-1})^T (b_k - b_{k-1}) \geq T$$
$$b_{k+1} = \frac{Ab_k}{\|Ab_k\|}$$
$$k = k + 1$$
end where $b_k$ is the estimated eigenvector and T is some threshold which determines when the estimation is close enough.

The evaluating of focus region groups discussed in relation to FIG. 3b, step 224, include the act of giving each focus region group a score. One method for calculating the scores of the focus region groups is to use a normalized scoring system. However, the skilled person appreciate that there are a plurality of scoring methods applicable to this application. For this particular embodiment, the size of the focus region group and the placement of the focus region group in the camera view is used to calculate a normalized score. The distance from the camera may also be included in the calculation. The score is normalized in a sense that it summarizes to one. When an object is identified and scored, it is apparent what possible remaining object score is left. Let O be a set of focus regions forming a focus region group. Further, let the set $O \subset \Omega$. Then the size score is calculated as:

$$SizeScore_O = \sum_{i=0}^{n} \frac{P_i \cap O}{n}$$
$$\sum_{i=0}^{n} \frac{P_i}{n} = 1$$

where n is the number of focus regions used.

Objects that are centered are often of greater interest, thus a centre score may be derived. The centre score may be calculated by multiplying the focus region grid with a discrete two dimensional Gaussian distribution having a peak in the centre of the camera view:

$$CenterScore_O = \sum_{i=0}^{n} (G_i * P_i) \cap O$$
$$\sum_{i=0}^{n} G_i = 1$$

A final score is calculated as a mean of the size and centre score.

$$FinalScore_O = \frac{SizeScore_O + CenterScore_O}{2}$$

What is claimed is:

1. Method for focusing a camera, wherein a plurality of focus regions are defined in the camera view, said method comprising:
   repeatedly setting a focus distance of the camera to focus at different distances by setting a lens distance of the camera to different lens distance values,
   determining, in response to setting a lens distance, a focus value for each focus region at the set lens distance value,
   estimating, when a plurality of focus value and lens distance value pairs have been determined, a function of at least degree two for a plurality of focus regions, wherein the function represents focus values as a function of lens distance values,
   calculating, for each focus region for which a function has been estimated, a local maximum point of the function, the local maximum point having a lens distance value,
   grouping focus regions based on the lens distance value of the local maximum point of the focus regions and spatial distances between the focus regions,
   rating the focus region groups resulting from the grouping of focus regions, and
   selecting a focus region based on said rating of focus region groups,
   running a focus searching algorithm starting searching at the lens distance value of the calculated local maximum of the focus value in the selected focus region, and
   setting the lens distance value to the lens distance value found by the focus searching algorithm.

2. Method for focusing a camera according to claim 1, wherein the focus value of a lens distance is determined using a contrast measurement method.

3. Method for focusing a camera according to claim 1, wherein the act of estimating a function is estimating a polynomial.

4. Method for focusing a camera according to claim 1, wherein the act of estimating a function is estimating a spline function.

5. Method for focusing a camera according to claim 1, wherein said grouping of focus regions includes applying an image segmentation algorithm on the focus regions using the lens distance value of each focus region and the spatial distance from each focus region to all other focus regions.

6. Method for focusing a camera according to claim 5, wherein the image segmentation algorithm used is a Graph-Theoretic Clustering algorithm.

7. Method for focusing a camera according to claim 1, wherein said rating of focus region groups is rating the focus region groups based on size of the group, a larger focus region group is rated as preferred in view of a smaller focus region group.

8. Method for focusing a camera according to claim 1, wherein said rating of focus region groups is rating the focus region groups based on position of the focus region group within the camera view, a focus region group having a position closer to a predetermined position is rated as preferred in view of a focus region group having a position at a greater distance from the predefined position.

9. Method for focusing a camera according to claim 7, wherein the rating is performed by distributing scores, a focus region group being more preferred is receiving more scores than a focus region group not being preferred as much, and wherein the selecting of a focus region is selecting a focus region included in a focus region group that has received more than half the available scores.

10. Method for focusing a camera according to claim 7, wherein the rating is performed by distributing scores, a focus region group being more preferred is receiving more scores than a focus region group not being preferred as much, and wherein the selecting of a focus region is selecting a focus region included in a focus region group that has received more scores than are left to distribute.

11. Method for focusing a camera according to claim 1, wherein the focus searching algorithm is restricted to operate within the focus regions of the focus region group including the selected focus region.

12. Camera comprising:
a plurality of focus regions defined in relation to a camera view of the camera,
means for repeatedly setting the lens distance of the camera to different lens distance values,
means for determining, in response to setting of a lens distance, a focus value for each focus region at the set lens distance value,
a function estimator arranged to estimate, when a plurality of focus value and lens distance value pairs are determined, a function of at least degree two for each focus region, wherein the function represents focus values as a function of lens distance values,
means for calculating, for each focus region, a local maximum point of the function, the local maximum point including a lens distance value,
a region grouping means arranged to group focus regions based on the lens distance value of the local maximum point of each focus region and spatial distances between the regions,
rating means arranged to rate the focus region groups resulting from the grouping of focus regions, and
focus region selector arranged to select a focus region based on said rating of focus region groups.

13. Camera according to claim 12, wherein the function estimator is arranged to estimate a polynomial based on the determined plurality of focus value and lens distance value pairs.

14. Camera according to claim 12, wherein the region grouping means is arranged to group the regions by means of an image segmentation algorithm on the focus regions using the lens distance value of each focus region and the spatial distance from each focus region to all other focus regions.

* * * * *